United States Patent [19]
Ueno et al.

[11] Patent Number: 5,530,690
[45] Date of Patent: Jun. 25, 1996

[54] MULTI-NEEDLE RECORDING HEAD AND METHOD OF MANUFACTURING THE SAME

[75] Inventors: Noboru Ueno; Yuki Nakamura; Fumito Komatsu; Toshitatsu Kawatsu, all of Nagano, Japan

[73] Assignee: Kabushiki Kaisha Sankyo Seiki Seisakusho, Nagano, Japan

[21] Appl. No.: 277,423

[22] Filed: Jul. 18, 1994

[30] Foreign Application Priority Data

Jul. 16, 1993 [JP] Japan ................................. 5-197637

[51] Int. Cl.⁶ ........................................... G11B 9/00
[52] U.S. Cl. ........................ 369/126; 346/139 C; 347/148
[58] Field of Search ..................... 369/126; 346/139 C; 347/123, 127, 128, 148; 156/634, 300

[56] References Cited

U.S. PATENT DOCUMENTS

| | | | |
|---|---|---|---|
| 3,955,204 | 5/1976 | Anton | 346/139 C |
| 3,968,500 | 7/1976 | Meisel et al. | 346/139 C |
| 4,131,986 | 1/1979 | Eseriva et al. | 346/139 C |
| 4,162,503 | 7/1979 | Potma et al. | 346/139 C |
| 4,165,514 | 8/1979 | Ishima | 346/139 C |
| 4,534,814 | 8/1985 | Volpe et al. | 156/300 |
| 4,558,334 | 12/1985 | Fotland | 347/123 |
| 4,607,268 | 8/1986 | Pointner et al. | 346/139 C |
| 4,963,886 | 10/1990 | Fukuda et al. | 346/139 C |
| 4,975,719 | 12/1990 | Komatsu | 347/148 |

FOREIGN PATENT DOCUMENTS 2-239953  9/1990  Japan ................. B41J 2/395
6-115150  4/1994  Japan .

Primary Examiner—Loha Ben
Attorney, Agent, or Firm—Sughrue, Mion, Zinn, Macpeak & Seas

[57] ABSTRACT

A multi-needle recording head has retaining members within an electrode support block, each retaining member serving to retain a recording electrode wire. The retaining members can not only lessen a stress generated by the hardening and contracting of a resin, but also prevent generation of defects such as cracks in the vicinity of recording electrodes on a head surface. Further, such multi-needle recording head is obtained by retaining the recording electrode wires by the retaining members, each retaining member having a pressure sensitive adhesive agent or an adhesive arranged at least on a surface thereof contacting the recording electrode wire, with the recording electrode wires wound around the winding jig before the recording electrode wires are cast into the electrode support block made of the electrically insulating resin. The retaining members within the electrode support block contribute to shortening the recording electrode wire supporting pitch, which not only prevents the recording electrode wires from being displaced or slackened due to the charging of the resin, but also prevents the recording electrode wires from being displaced or slackened by controlling the intimate contact between the recording electrode wires due to surface tension of the resin in the vicinity of the head surface or due to linear expansion caused by the heat of the resin to a small degree. Therefore, recording electrodes linearly arranged at a predetermined pitch can be formed.

6 Claims, 9 Drawing Sheets

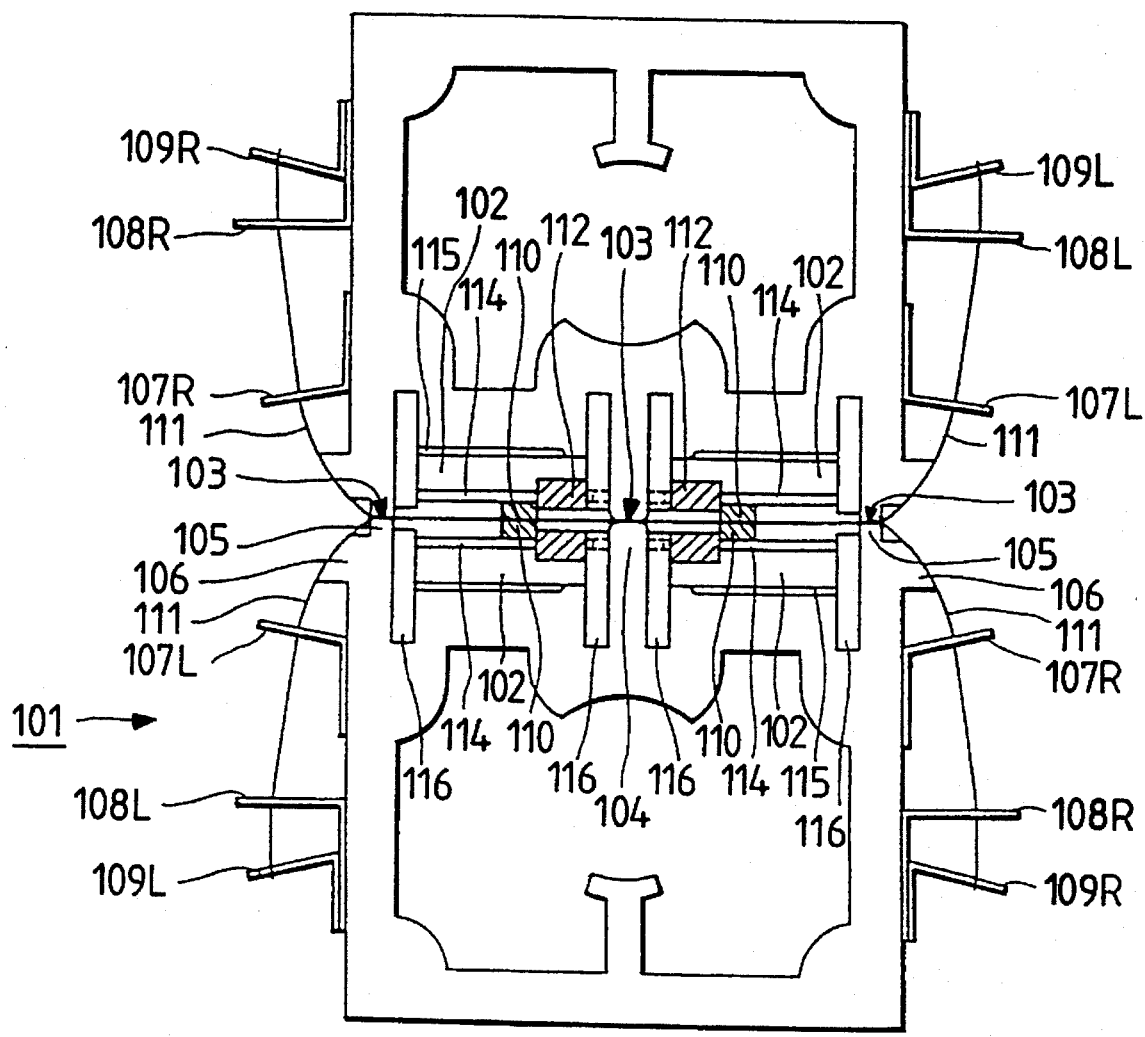

MULTI-NEEDLE RECORDING HEAD AND METHOD OF MANUFACTURING THE SAME

BACKGROUND OF THE INVENTION

1. Field of the Invention

The invention relates to a multi-needle recording head adapted to be used for electrostatic recording and to a method of manufacturing such multi-needle recording head. More particularly, the invention is directed to an improved multi-needle recording head formed by fixing two staggered arrays of recording electrode wires arranged at a predetermined pitch by an electrically insulating electrode support block and to an improved method of manufacturing such multi-needle recording head by fixing the recording electrode wires while wound around a winding jig, and the present invention relates to a molding apparatus used for manufacturing a multi-needle recording head adapted to be used for electrostatic recording. More particularly, the invention is directed to an improved structure for supporting control electrodes within cavity grooves of a mold into which an electrically insulating resin is charged.

2. Related Art

A multi-needle recording head used for electrostatic recording is generally formed so that a first array of recording electrodes consisting of N blocks of wires, each block including M wires and a second such array of recording electrodes are arranged at a high density at a predetermined pitch. The second array of recording electrodes are disposed in parallel with the first array of recording electrodes at a predetermined distance from the first array of recording electrodes. These recording electrodes are fixed by an electrode support block made of an electrically insulating resin so that the respective end faces of the recording electrodes are exposed.

A method of manufacturing the thus constructed multi-needle recording head has already been disclosed by the inventors (Japanese Patent Unexamined Publication No. 2-239953). The method is such as efficiently producing the multi-needle recording heads using two winding jigs 301 such as shown in FIG. 6. This winding jig 301 includes: cavity grooves 305 into which an electrode-support-block-forming resin is charged with control electrodes 100 set; wire retaining grooves 309, formed at projections 306, 307, 308 on the edges of the cavity grooves 305 so as to traverse the cavity grooves 305, for allowing recording electrode wires 200 to be arranged at a predetermined pitch; and directing pins 302, binding pins 303, and turn pins 304 that allow the wires 200 to be hooked and wound in an arbitrary direction and at an arbitrary position on both side wall surfaces of the winding jig 301. A single recording electrode wire is continuously wound by alternately twisting the wire on the pins 302, 303, 304 so as to traverse the cavity grooves 305 after the control electrodes 100 have been set in the cavity grooves 305 of the winding jig 301, and M×N recording electrode wires 200 are stretched over the cavity grooves 305 at a predetermined pitch by binding the wires every block of recording electrodes.

The winding of a wire 200 around the winding jig 301 is mechanically done in the following way. The wire 200 is paid off from a nozzle 312 of a wire supply unit 310 while given some tension by a not shown back tension mechanism utilizing both a reciprocal linear motion along the axis of a wire guide means 311 (in the direction indicated by the arrows) and oscillation or rotation of the winding jig 301, and hooked on the predetermined pins 302, 303, 304, and wire retaining grooves 309, . . . , 309. The thus prepared winding jig 301 is set end-to-end with the other winding jig (not shown) similarly prepared with the second array of recording electrodes and control electrodes set. Then, the resin is charged into a space formed between the cavity grooves 305, 305 of the two butted winding jigs 301, 301 to form the electrode support block. In the middle of the space formed between the cavity grooves 305, 305 are wires 200, 200 forming the first and second arrays of recording electrodes and the corresponding control electrodes 100, 100. These wires 200, 200 and control electrodes 100, 100 are disposed in parallel with each other under a predetermined positional relationship. The electrode-support-block-forming resin is charged into the periphery of these wires 200 and electrodes 100. After the electrode support block has been solidified, a bundle of wires 200 is taken out of the turn pins 304, and the multi-needle recording heads are taken out of the winding jigs 301, 301.

Further, this conventional winding method addresses another problem. That is, even if the wires are wound in parallel at a predetermined pitch so as to traverse the cavity grooves 305, when the resin is charged into the space formed between the two cavity grooves 305, 305 by placing the two winding jigs 301, 301 with windings end-to-end to form the electrode support block, the recording electrode wires 200 slacken due to linear expansion caused by the heating involved in the hardening of the resin or the like. Further, in the case of using a thermosetting resin as the electrically insulating resin and heating the winding jigs 301, 301 after the resin has been charged, the wires likewise slacken due to heat. That is, if the width of the cavity groove 305 between the wire retaining grooves 309, 309 on the projections 306 and 307 or 306 and 308 on both sides of the cavity groove which retain the recording electrode wires 200 is large, the linear expansion of the recording electrode wires 200 due to heat produced by the electrically insulating resin becomes so affecting as not to be neglected, causing such a level of slackening as shown in FIG. 4(C). Still further, this slackening may accompany such a displacement of the recording electrode wires 200 as shown in FIG. 4(B) by intimate contact between wires due to the flow or surface tension of the resin even if the recording electrode wires 200 have been wound correctly.

Since such slackening and displacement from grooves of the recording electrode wires cause serious electrode performance defects such as defective linearity, defective pitch, and defective shortcircuiting of the recording electrodes such as shown in FIGS. 5(B) and (C), an improvement in the conventional winding method has been called for.

However, in the case of forming the mold 301 by using an extruded aluminum member, relatively thin projecting portions, particularly, the projections 306, 307, 308 outside the cavity grooves 305 tend to produce under cut portions with inward deformation. If the control electrode support plates 314, 315 are arranged along the projections 306, 307, 308 to overcome this problem, it becomes sometimes difficult to take out the multi-needle recording head from the mold 301 after both the control electrodes 102a, 102b and the wires 310 forming the recording electrodes have been fixed by charging the resin into the cavity grooves 305.

SUMMARY OF THE INVENTION

The object of the invention is to provide a method of manufacturing a multi-needle recording head capable of preventing slackening or displacement from grooves of recording electrode wires wound around a winding jig in the process of charging an electrode-support-block-forming electrically insulating resin or in a like process.

Another object of the invention is to provide a molding apparatus that allows a multi-needle recording head as just molded to be taken out with ease even if under cut portions are present.

To achieve the above object, the invention is applied to a multi-needle recording head having an electrode section thereof formed by arranging recording electrode wires at a predetermined pitch and molding the arranged recording electrode wires into an electrically insulating electrode support block. In such a multi-needle recording head, retaining members for retaining the recording electrode wires are provided within the electrode support block.

Further, in a multi-needle recording head of the invention, each retaining member has a pressure sensitive adhesive or an adhesive arranged at least on a surface thereof contacting the recording electrode wire, and each retaining member may preferably be made of an elastic member.

Still further, a multi-needle recording head of the invention is manufactured by a method characterized as retaining the recording electrode wires by the retaining members, each retaining member having a pressure sensitive adhesive or an adhesive arranged at least on a surface thereof contacting the recording electrode wire, with the recording electrode wires wound around a winding jig before the recording electrode wires are molded into an electrically insulating electrode support block.

To achieve the above object, the invention is applied to an apparatus for molding a multi-needle recording head by supporting many needle-like recording electrodes and blocked control electrodes by arranging the needle-like recording electrodes and blocked control electrodes at a predetermined pitch by an electrode support block formed by solidifying an electrically insulating resin or the like. Such a multi-needle recording head molding apparatus includes: a mold not only having wire retaining grooves formed on at least two parallelly extending projections, the wire retaining grooves serving to arrange wires forming the recording electrodes at a predetermined pitch by engaging the wires therewith, but also having a cavity groove formed between the projections, the cavity groove serving to receive the resin for solidifying the wires; at least two control electrode support plates for supporting a wiring board at both side edges of the wiring board, one side edge of the wiring board being a terminal section having the control electrodes electrically connected thereto in advance; and an adjusting plate made of an elastic member and interposed between the control electrode support plate and the projection. In such multi-needle recording head molding apparatus, the adjusting plate and the control electrode support plates can be disposed on the inner sides of the projections.

It is preferable that the control electrode support plates and the adjusting plate be inserted into plate engaging grooves arranged in the cavity groove of the mold and be releasably fixed to the mold with a pin passing through the plate engaging grooves.

Therefore, the recording electrode wires extending so as to traverse the cavity grooves by the retaining members that retain the recording electrode wires within the electrode support block, i.e., within the cavity grooves are supported at a short distance in a zone "a" between the wire retaining grooves and the retaining members on one side and in a zone "b" between the wire retaining grooves and the retaining members on the other side, respectively. As a result, even if the recording electrode wires are about to contact each other due to the flow or surface tension of the resin or are about to linearly expand due to heat of the resin when the resin is charged into the space formed between the winding jigs, such phenomena can be controlled to a small degree, thereby not allowing such phenomena to appear in the form of displacement or slackening of the recording electrode wires.

Particularly, in the case where the retaining members are disposed close to a head surface position 17, there is no likelihood that the recording electrode wires exposed to the head surface will be displaced or slackened.

Further, if a pressure sensitive adhesive or an adhesive is arranged on the retaining members, the recording electrode wires neither move nor linearly expand in the vicinity of the retaining members since the recording electrode wires are cast into the electrode support block with the wires already fixed to the electrode support block. Therefore, the recording electrode wires will not be displaced or slackened.

Therefore, to arrange the control electrodes within the cavity grooves of the mold, the control electrodes and wiring boards already connected to each other are inserted into the cavity grooves while supported by the control electrode support plates, so that the control electrodes and the wiring boards can be fixed so as to bias the control electrodes support plates on both ends onto the projections with the adjusting plates elastically deformed. Then, after the wires forming the recording electrodes are wound at a predetermined pitch, these wires are fixed by the electrically insulating resin. By taking the adjusting plates out while elastically deformed thereafter, a gap is provided between the control electrode support plates and the projections of the mold to allow the head to be separated from the mold together with the control electrode support plates. Then, after taking the head and the control electrode support plates out of the cavity grooves, the control electrode support plates are removed from the head. As a result, the control electrodes are projected from one end of the head, and the terminal sections of the wiring boards are projected from the other end.

BRIEF DESCRIPTION OF THE DRAWINGS

FIG. 3 is a diagram illustrative of a relationship of a double cavity mold type winding jig with a wire, a retaining member, and the like in a resin charging process of a multi-needle recording head manufacturing method of the first embodimetn of the present invention;

DETAILED DESCRIPTION OF THE PREFERRED EMBODIMENTS

Figure 1:
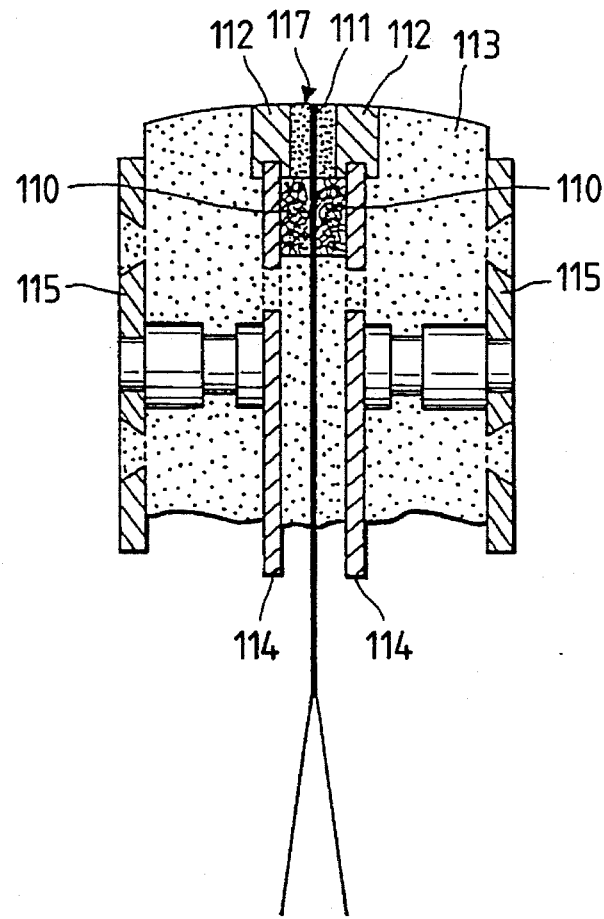
FIG. 1 is a longitudinal sectional view showing a multi-needle recording head, which is a first embodiment of the present invention.
Figure 2:
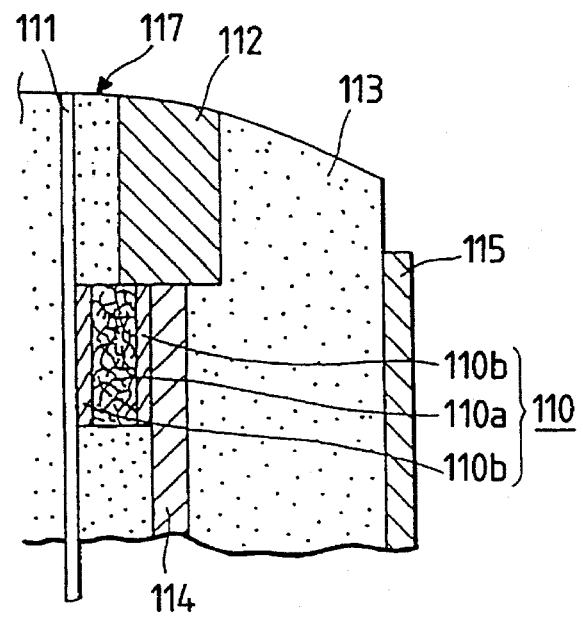
FIG. 2 is an enlarged sectional view showing the main portion of the multi-needle recording head of FIG. 1.

The construction of the invention will now be described in detail with reference to an embodiment shown in the drawings.

First Embodiment

FIG. 1 shows a multi-needle recording head, which is an embodiment of the invention. This multi-needle recording head is formed by fixing first and second staggered arrays of recording electrodes and many control electrodes 112 interposing the such arrays of recording electrodes therebetween by an electrode support block 113 made of an electrically insulating resin. The first and second arrays of recording electrodes are formed of recording electrode wires 111. Each array consists of M×N wires. On both sides of the electrode support block 113 are mounting plates 115. These mounting plates 115, which are rigid, serve also as reinforcing plates and are integrally formed by insert molding. The control electrodes 112 are soldered to respective one side edges of wiring boards 114 in advance and are embedded in the electrode support block 113 so as to be fixed to the wiring boards 114. Between the wiring boards 114 adjacent to the control electrodes 112 are retaining members 110 embedded to retain the recording electrode wires 111. While the retaining member 110 may be made of a single elastic member or nonelastic member, an electrically insulating elastic member formed by sandwiching a MORUTOPRENE member 110a having cushioning function, made from, for instance, plastic, sponge or the like between pressure sensitive adhesive double coated tapes 110b is preferably used. The retaining members 110 cause the recording electrode wires 111 to adhere to each wiring board 114, so that the recording electrode wires 111 can be fixed to the wiring board 114. The retaining members 110 are arranged so that the retaining members 110 are first placed on the wiring boards 114 before the resin is charged and then the recording electrode wires 111 are wound thereon.

The thus constructed multi-needle recording head may be manufactured, e.g., by the following method.

Figure 6:
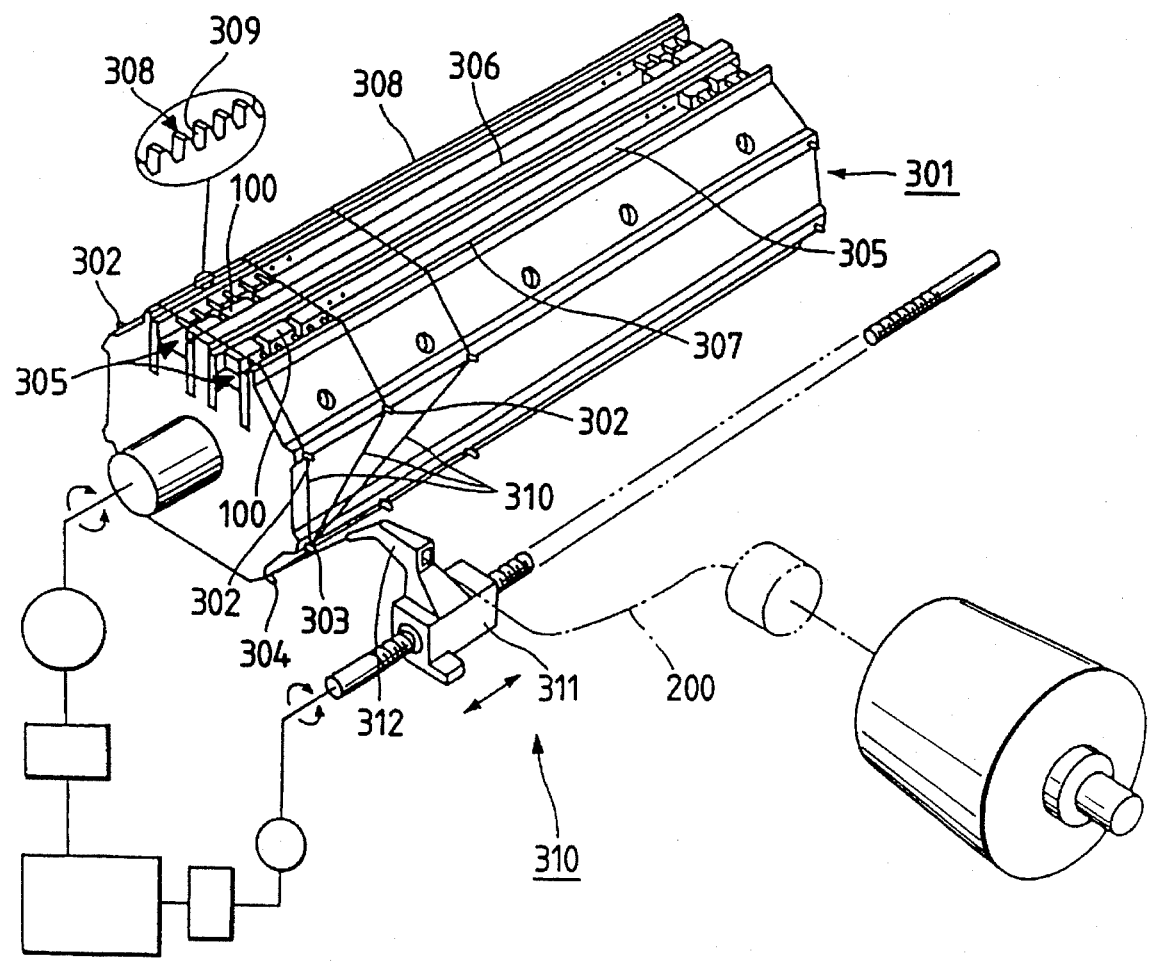
FIG. 6 is a perspective view showing an exemplary winding jig for manufacturing a conventional multi-needle recording head.

A winding jig used for embodying the method of manufacturing the multi-needle recording head of the invention will be described first. While this winding jig is not limited to that of a particular construction, a winding such as shown in FIG. 6 may preferably be used. That is, the winding jig being of such a type that recording wires are wound so as to traverse cavity grooves for molding an electrode support block by charging an electrically insulating resin may preferably be used.

For example, one preferable winding jig is shown in FIG. 3. This winding jig 1 includes: cavity grooves 102 for molding an electrode support block 113 by charging an electrically insulating resin; wire retaining grooves 103 for retaining the recording electrode wires 11; a receiving portion 106 for receiving and supporting the recording electrode wires 111 among directing pins $107_L$, $107_R$, binding pins $108_L$, $108_R$, and turn pins $109_L$, $109_R$, each pin hooking the recording electrode wires 111, and between the wire retaining grooves 103 and the directing pins $107_L$, $107_R$. A single recording electrode wire 111 is wound around the winding jig 101 repetitively so as to traverse the cavity grooves 102 by utilizing these pins $107_L$, $107_R$, $108_L$, $108_R$, $109_L$, $109_R$. The shown winding jig 101 is of a double cavity mold type that can fabricate two heads simultaneously. A single cavity mold type winding jig having only one cavity groove 102 may also be used.

The wire retaining grooves 103 extend along the upper surfaces of projections 104, 105 on both sides of each cavity groove 102 in such a direction as to traverse the cavity groove 102. This wire retaining grooves 103, each being a V-shaped groove whose depth and width are substantially equal to the diameter of the recording electrode wire 111, extend at a pitch substantially two times the diameter of the recording electrode wire 111. Further outside the projections 104, 105 on both sides are the directing pins $107_L$, $107_R$, the binding pins $108_L$, $108_R$, and the turn pins $109_L$, $109_R$. The directing pins $107_L$, $107_R$ guide the recording electrode wires 111 toward a direction; the binding pins $108_L$, $108_R$ group the recording electrode wires 111 into blocks by the type; and the turn pins $109_L$, $109_R$ turn the recording electrode wires 111 by twisting. Therefore, the position and direction of the wires 111 can be changed by utilizing these directing pins $107_L$, $107_R$, binding pins $108_L$, $108_R$, and turn pins $109_L$, $109_R$.

Further, the receiving portion 106 prevents oblique winding of the recording electrode wire 111 on the wire retaining groove 103 by preventing sideward slippage of the recording electrode wire 111 that is obliquely set in the wire retaining groove 103 with the receiving portion 106 being abutted against the recording electrode wire 111 to be wound between the wire retaining groove 103 and the directing pins $107_L$, $107_R$ and thereby guiding the recording electrode wire 111 on the extension of the wire retaining groove 103 as much as possible. The receiving portion 106 of this embodiment is formed of an arcuate projection that projects as a canopy, and is abutted against the recording electrode wire in almost all the area thereof. In FIG. 1, reference numeral 116 designates a support plate. The control electrodes 112 are supported by the support plates 116 accommodated in the cavity grooves 102 together with the wiring boards 114 supporting the control electrodes 112.

While a wire supply unit that supplies the recording electrode wires 111 to the winding jig 101 is not particularly shown in the drawings, the wire supply unit may be constructed as shown in, e.g., FIG. 6. That is, a wire supply unit that supplies a recording electrode wire to a nozzle unit by uncoiling the recording electrode wire while applying a predetermined back tension to the wire. This nozzle unit is mounted on a feeder mechanism that gives reciprocating linear motion along the winding jig 101.

The multi-needle recording head is manufactured in the following way using the thus constructed winding jig 101.

First, the control electrodes 112 supported by the wiring boards 114 are placed in the cavity grooves 102 of a pair of winding jigs 101 while supported by the support plates 116 before the recording electrode wires 111 are wound around the respective winding jigs 101. On each wiring board 114 adjacent to the control electrode 112 is a retaining member 110. The retaining member 110 is formed by sticking the pressure sensitive adhesive double coated tapes 110b, 110b on both surfaces of the MORUTOPRENE member 110a in this embodiment. The retaining member 110 is arranged to a height slightly higher than the recording electrode wires 111 wound around the winding jig 101. That is, the recording electrode wires 111 are wound so as to bite into the retaining members 110 made of MORUTOPRENE.

Figures 4A, 4B, 4C:
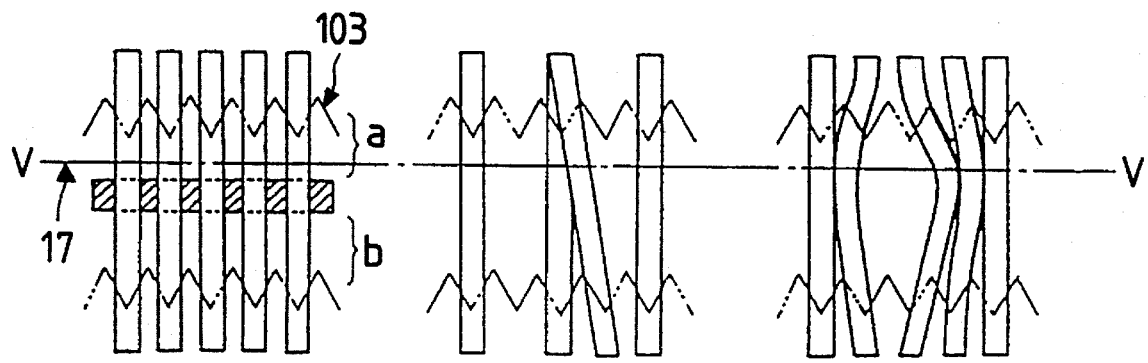
FIG. 4(A) is a plan view showing a satisfactory winding conditions.
FIG. 4(B) is a plan view showing an out-of-groove winding conditions.
FIG. 4(C) is a plan view showing a slackened winding conditions.
Figures 5A, 5B, 5C:
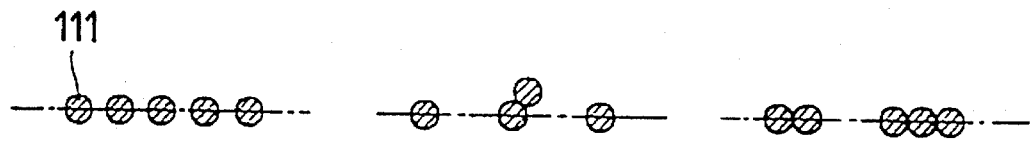
FIG. 5(A) is a sectional view taken along a line V—V of FIG. 4, showing an arrangement satisfactory head of recording electrodes.
FIG. 5(B) is a sectional view taken along a line V—V of FIG. 4, showing an out-of-groove arrangement of recording electrodes.
FIG. 5(C) is a sectional view taken along a line V—V of FIG. 4, showing a slackened arrangement of recording electrodes.

Then, the recording electrode wires 111 are neatly arranged on the M×N wire retaining grooves 103 at a predetermined pitch so as to traverse the cavity grooves 102 by winding or hooking the wires on the respective pins $107_L$, $107_R$, $108_L$, $108_R$, $109_L$, $109_R$ of the winding jig 101 using the wire supply unit having the nozzle unit such as shown, e.g., in FIG. 6. While a detailed description of the winding and hooking of a recording electrode wire 11 on the respective pins $107_L$, $107_R$, $108_L$, $108_R$, $109_L$, $109_R$ will be omitted since this is not particularly important in this embodiment, it should be noted that the recording electrode wire 11 is wound and booked while distributed to N wire retaining grooves 103 utilizing N directing pins during the time in which N turns of the wire are made on a single turn pin and wire binding pin with the nozzle being moved in a direction orthogonal to the wire retaining grooves 103. By repeating this operation, a total of M×N recording electrode wires 111 (e.g., 7040 wires) are wound. At this time, each recording electrode wire 111 is wound while biased onto the receiving portion 106. Therefore, the recording electrode wires 111 can be wound with displacements suppressed by frictional force with respect to the receiving portion 106. As a result of this operation, each recording electrode wire 111 is wound on the wire retaining grooves 103 of the winding jig 101 so as not to be out of place. Further, on the cavity groove 102 between both outer side wire retaining grooves, the recording electrode wire 111 is carried on the retaining member 110, so that the recording electrode wire 111 can be fixed to the pressure sensitive adhesive double coated tape 110b on the surface of the retaining member 110 so as to bite into the retaining member 110 by deforming both the MORUTOPRENE member 110a and the pressure sensitive adhesive double coated tape 110b. Hence, the recording electrode wires 111 can form recording electrodes that are linearly arranged at a predetermined pitch so as not to overlap one upon another as shown in FIGS. 4(A) and 5(A), free from slackening and misalignment from grooves at the portion 117 adjacent to the control electrodes 112 on which the recording electrodes are formed.

Upon completion of winding, the pair of winding jigs 101 are set end-to-end so as to cause the cavity grooves 102 and the projections 104, 105 to confront each other. At this time, not only a spacer (not shown) for maintaining a predetermined gap between the recording electrodes is interposed between the respective projections 104, 104, 105, 105 of the butted pair of winding jigs 101, but also the recording electrode wires 111 of one of the winding jig 101 are staggered with respect to those of the other winding jig 101 by the half pitch (P/2). Then, members (not shown) for closing both end openings of the cavity grooves 102 are attached to both end faces of both winding jigs 101 to charge molten insulating resin to both cavity grooves 102 from a resin charging inlet alternately, so that the electrode support block 113 is formed to fix the recording electrode wires 111, the control electrodes 112, and the like. Even if the recording electrode wires 111 are affected by the flow and heat of the resin charged into the space in the winding jigs during this process, the recording electrode wires 111 exposed to the head surface position 117 are fixed by the retaining members 110 and the wire retaining grooves 103. As a result, these recording electrode wires 111 are free from displacement and slackening and, therefore, are arranged linearly at a predetermined pitch as shown in FIG. 5(A).

Upon completion of charging the resin into the cavity grooves, the winding jigs 101 are separated from each other after the recording electrode wires 111 wound and hooked on the respective turn pins $109_L$, $109_R$ have been taken out, and the head elements are taken out of the respective cavity grooves 102. Then, after a predetermined process such as the process of polishing the head surfaces, the fabrication of the multi-needle recording heads is completed.

While the above embodiment is one preferred embodiment of the invention, the embodiment of the invention is not limited thereto, but may be modified in various modes within the scope and spirit of the invention. For example, while the retaining member 110 of the above embodiment is made of the MORUTOPRENE member 110a and the pressure sensitive adhesive double coated tape 110b, the retaining member 110 may be made of an elastic member such as rubber, and a nonelastic member such as a plastic or metal plate. In this case, since the retaining member 110 supports the recording electrode wires 111 that require stringent dimensional accuracy, a stringent height tolerance must be observed lest the recording electrode wires 111 should excessively lift or should be substantially unsupported. For this reason, it is preferable to arrange on the surface of a hard plate member such a thick pressure sensitive adhesive double coated tape or a pressure sensitive adhesive as to be elastically deformable. Further, while the retaining member 110 is preferably electrically insulating, electric insulation is not particularly necessary as long as the recording electrode wires 111 themselves are electrically insulated. Still further, the retaining member 110 may, in some cases, be formed only of a pressure sensitive adhesive double coated tape having such a thickness as to allow the recording electrode wire 11 to set therein sufficiently deep.

Second Embodiment

A second embodmiement of the present invention will now be described in detail with reference to the drawings.

An exemplary multi-needle recording head molding apparatus and an exemplary multi-needle recording head of the invention obtained by such apparatus will be described with reference to FIGS. 7 to 12.

Figure 8:
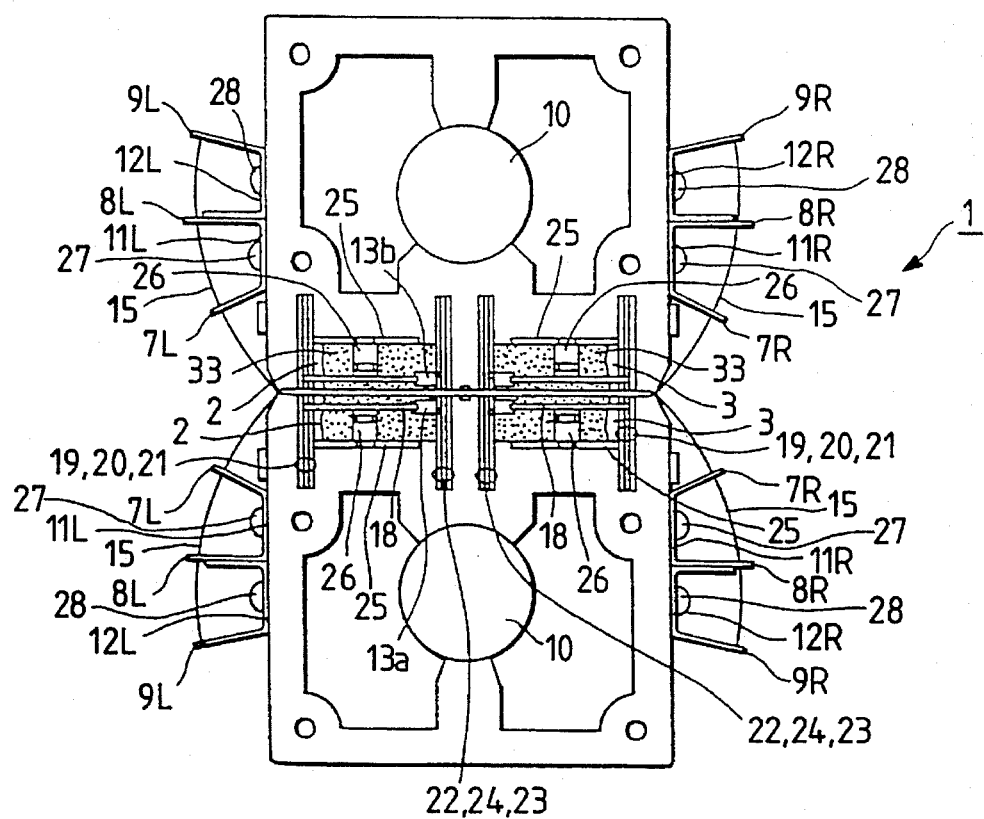
FIG. 8 is a sectional view showing a condition in which a resin forming an electrode support block is charged with electrodes set in a pair of molds.

A mold 1 shown in FIG. 8 is a double cavity type mold that can produce two multi-needle recording heads at the same time, and is also a split mold that is used by setting two molds 1, 1 end-to-end. These paired molds 1, 1 have the same structure. Control electrodes 13a and wires 15 that form the recording electrodes 101a shown in FIG. 11 on one side are attached to one mold 1, and control electrodes 13b and wires 15 that form the recording electrodes 101b shown in FIG. 12 on the other side are attached to the other mold 1. When the pair of molds 1, 1 are placed end-to-end, the recording electrodes 101a, 101b and the control electrodes 13a, 13b are arranged in parallel with each other while maintaining a predetermined positional relationship in a space formed therebetween, so that an electrode-support-block-forming resin can be charged into the periphery of such arranged electrodes.

Such mold 1 can be prepared easily by extruding, e.g., an aluminum member, forming wire retaining grooves 14 to the extruded member, and finally arranging on both sides of the extruded member plates $11_L$, $11_R$, $12_L$, $12_R$ having various types of pins $7_L$, $7_R$, $8_L$, $8_R$, $9_L$, $9_R$ for completion.

Figure 7:
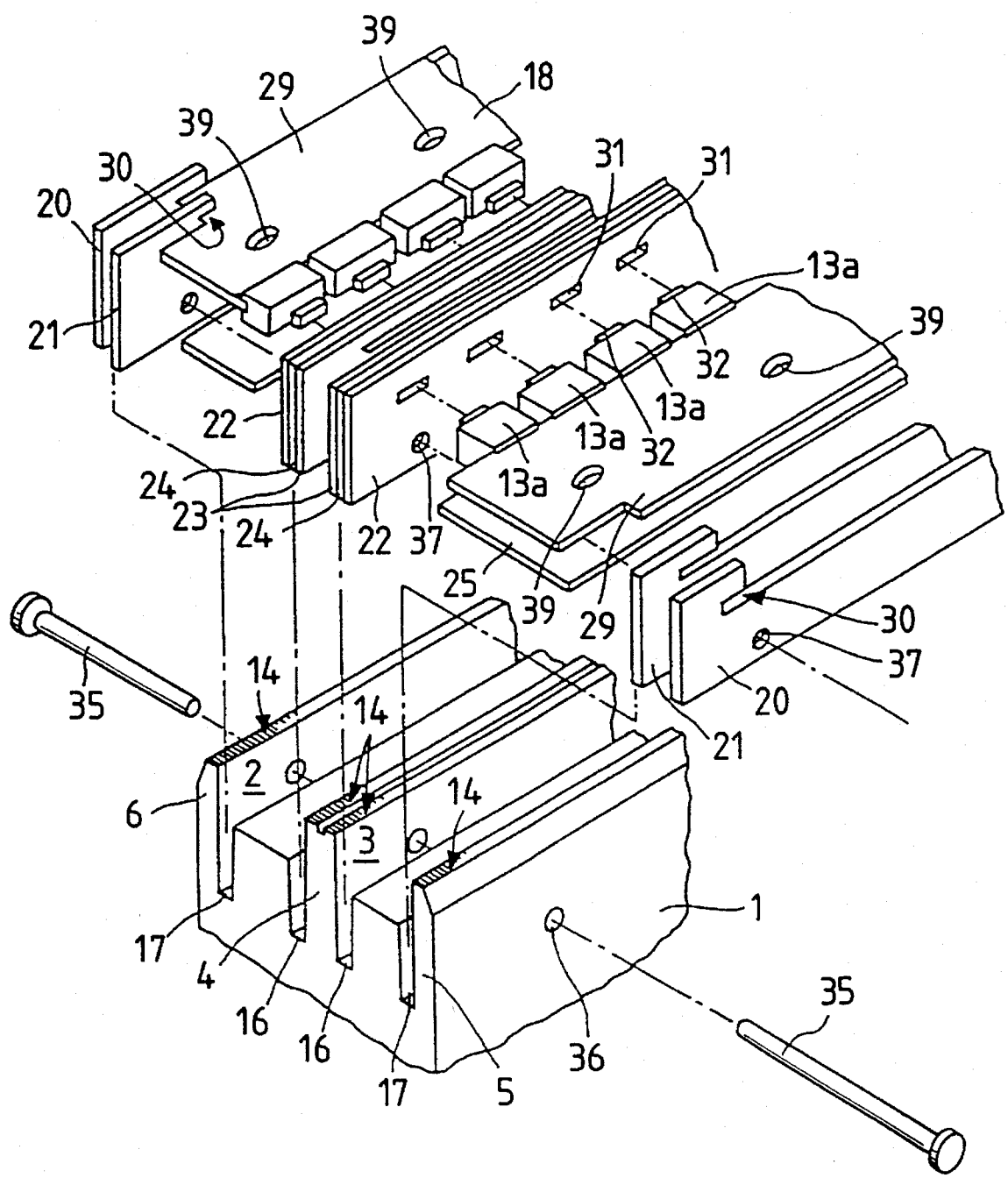
FIG. 7 is an exploded perspective view illustrative of how control electrodes and other parts are put into cavity grooves of a mold of a second embodiment of the present invention.
Figure 9:
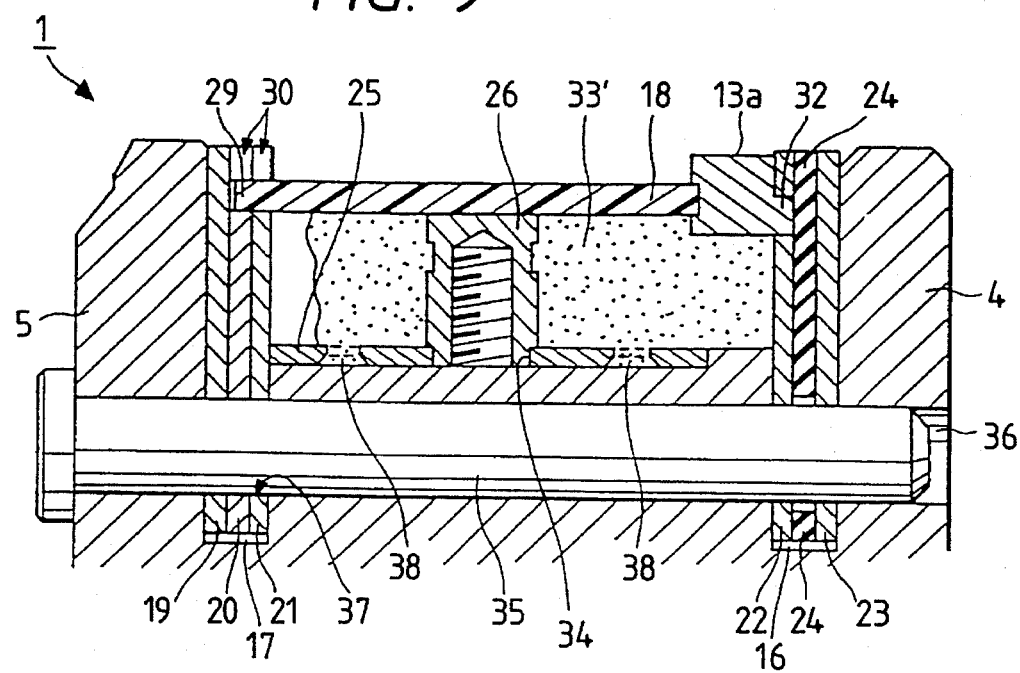
FIG. 9 is an enlarged sectional view highlighting a single cavity groove to illustrate an exemplary apparatus for molding a multi-needle recording head of the second embodiment of the present invention.
Figure 10:
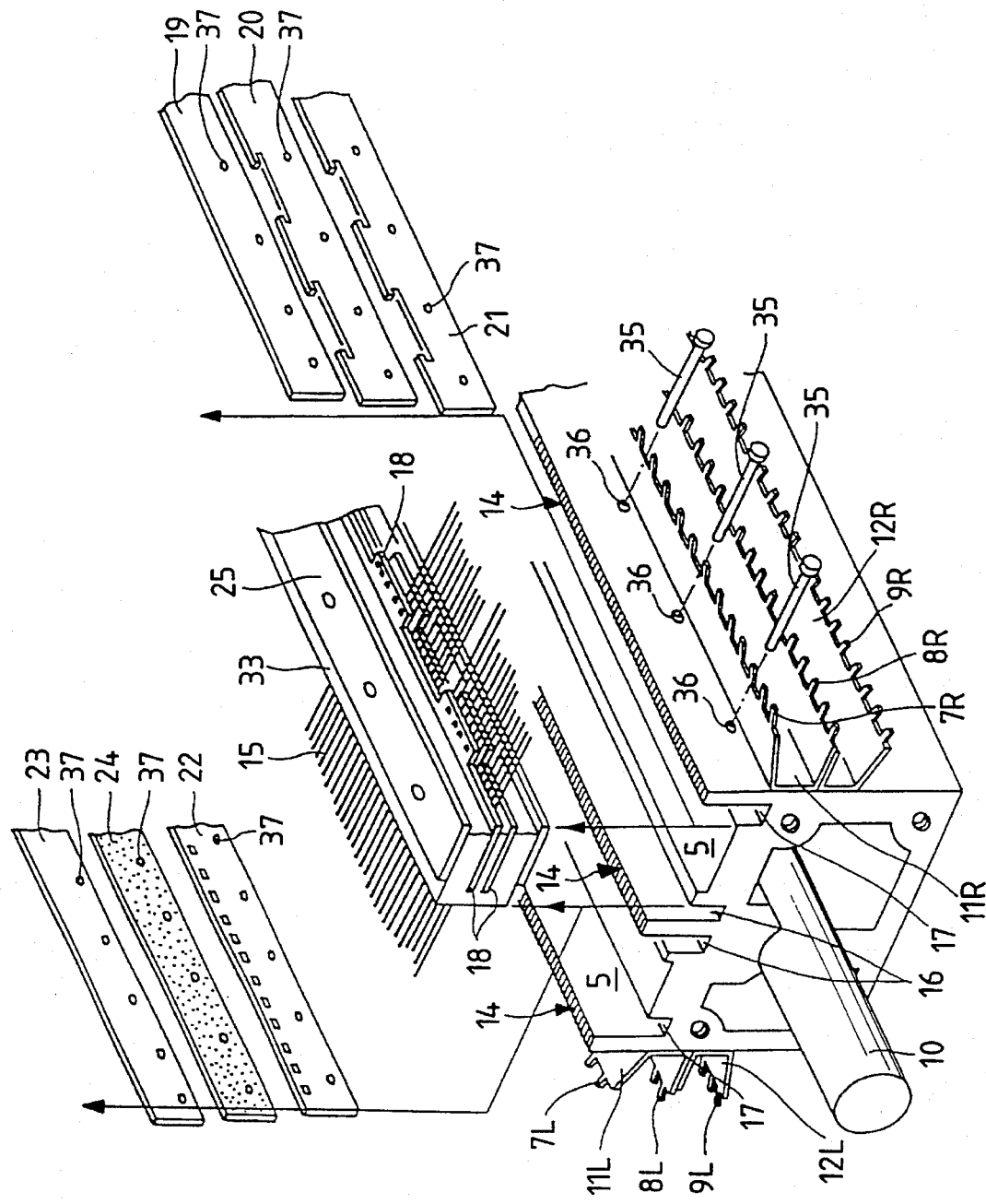
FIG. 10 is a perspective view showing a condition in which the multi-needle recording head and control electrode support block that have just been molded are taken out of the mold.

Further, the construction of the mold according to this embodiment will be described in detail with reference to one of the molds 1 that is shown in FIGS. 7 and 9. In the mold 1 two cavity grooves 2, 3 for receiving the control electrodes 13a and charging the resin are formed in parallel with each other, and projections 4, 5, 6 are formed between these cavity grooves 2, 3 and outside these cavity grooves 2, 3. As shown in FIG. 7, wire retaining grooves 14 for retaining the wires 15 that will become the recording electrodes are formed at a predetermined pitch on the projections 4, 5, 6. In the case of this mold 1, directing pins $7_L$, $7_R$ for guiding the wires 15 toward a direction, binding pins $8_L$, $8_R$ for binding the wires in block, and turn pins $9_L$, $9_R$ are arranged further outside the projections 4, 5, 6, i.e., outside the wire retaining grooves 14, so that the position and direction of the wires to be wound by utilizing these pins $7_L$, $7_R$, $8_L$, $8_R$, $9_L$, $9_R$ on both left and right sides can be changed. The wire 15 is wound between the directing pins $7_L$, $7_R$ so as to traverse the cavity grooves 2, 3 and is retained by the wire retaining grooves 14, 14 formed on the projection 4 between the cavity groove 2 and the cavity groove 3 as well as on the projections 5, 6 outside the cavity grooves 2, 3. As shown in FIG. 10, the cavity grooves 2, 3 extend in the axial direction of the mold 1. Plate engaging grooves 16, 17 are provided on the bottoms of the cavity grooves 2, 3. The mold 1 has a rotating shaft 10 for oscillatably supporting the mold 1 relative to a wire winding machine or the like.

The directing pins $7_L$, $7_R$ arranged on both left and right sides while interposing the wire retaining grooves 14, 14 therebetween guide the wires to be engaged with the wire retaining grooves 14, 14 toward a direction. A total of M (=256) pins are secured to each side wall portion of the mold 1 at a predetermined pitch. A total of N (=28) wires are wound per pair of pins. The wire binding pins $8_L$, $8_R$ on both sides guide the wires belonging to the same block of wire retaining grooves 14, 14 on the projections 5, 6 to a corresponding pair of turn pins $9_L$, $9_R$, the wire retaining grooves 14, 14 being divided into N blocks. The binding pins $8_L$, $8_R$ can wind exactly N (=213) wires. Further, each pair of turn pins $9_L$, $9_R$ not only binds and binds N (=28) wires, but also guides the wires to a next pair of pins. A total of M (=256) wire binding pins $8_L$, $8_R$ and turn pins $9_L$, $9_R$ are secured to each side wall portion of the mold 1. In this embodiment the respective pins $7_L$, $7_R$, . . . , $9_L$, $9_R$ are formed by blanking the side edge of a sheet or plate with a press or the like. The directing pin $7_R$ (or $7_L$) and the binding pin $8_R$ (or $8_L$) are formed on the same plate $11_R$ (or $11_L$), and the turn pin $9_R$ (or $9_L$) is formed on the separate plate $12_R$ (or $12_L$). The plates $11_L$, $11_R$ are secured to the mold 1 by machine screws 27 or the like and will not be taken out. On the other hand, the plates $12_L$, $12_R$ are releasably secured to the mold 1 by machine screw s28 or the like so as to be removed when the bound wires 15 are removed from the turn pins $9_L$, $9_R$.

There extend M×N wire retaining grooves 14 on each of the projections 4, 5, 6 in the direction of traversing the cavity grooves 2, 3 (in the direction orthogonal to the axial direction of the mold 1), the M×N wire retaining grooves 14 consisting of N (=28) blocks of grooves, each block including M (=256) grooves. Although not shown, the wire retaining grooves 14, each being a substantially V-shaped groove whose depth and width are substantially equal to the diameter of the recording electrode wire 15, extend at a pitch substantially two times the diameter of the recording electrode wire 15. The wire retaining grooves 14 allow the M×N wires 15 to be arranged in parallel at a predetermined pitch by engaging parts of the respective wires 15 to be wound around the mold 1 with the wire retaining grooves 14. The wire retaining grooves 14 on the projection 4 in the middle and the wire retaining grooves 14 on the projections 5, 6 on both sides are either flash with one another or such that the grooves on the projection 4 in the middle are slightly projected from the grooves on the projections 5, 6 on both sides. Further, the edges of each wire retaining groove 14 on each of the projections 4, 5, 6 are chamfered to prevent breakage of the wire 15 that is to be set therein.

To obtain multi-needle recording heads using the thus constructed mold 1, the control electrodes 13a, plates 25, and nuts 26 are attached to the cavity grooves 2, 3 of the pair of molds 1, 1 as shown in FIGS. 7 and 9 before the wires 15 are wound around each of the pair of molds 1, 1. Here, the control electrodes 13a are accommodated in the cavity grooves 2, 3 while soldered to the wiring boards 18 in advance. Although no particular limitation is given to the wiring board 18, a printed board made of fiberglass-reinforced plastic (FRP) that is prepared by, e.g., adding glass fiber to epoxy resin is preferably used. A wiring pattern (not shown) is formed on each wiring board 18 so that the wires can be taken out by the block of control electrodes 13a (or 13b). On a side edge of the wiring board 18 is a terminal section (not shown) for respective wiring patterns. The control electrodes 13a (or 13b) are electrically connected to a terminal section (not shown) on the other side edge of the wiring board in advance. Further, a portion 29 of the side edge having the terminal section is projected from a portion thereof having no terminal section so as to be engaged with notched grooves 30 formed on both control electrode support plates 20, 21. Therefore, the side edge 29 portion is exposed to the electrode support block 33 without fail. The control electrodes 13a (or 13b) are fixed to the terminal section of the wiring board 18 electrically, e.g., by soldering. Further, each wiring board 18 has a plurality of holes 39 formed preferably so as not to interfere with the wiring patterns, the holes 39 serving to allow the resin 33' forming the electrode support block 33 to be charged.

The control electrodes 13a and the wiring board 18 are supported by a plurality of control electrode retaining plates 19, 20, 21, 22, 23 and by an adjusting plate 24 made of an elastic member, all being engageable with plate engaging grooves 16, 17. These control electrode retaining plates 19, 20, 21, 22, 23 and the adjusting plate 24 are fixed by plate support pins 35 that are inserted into throughholes 36 of the mold 1 while engaged with the plate engaging grooves 16, 17. Each of the plates 19, . . . , 24 has a hole 37 through which the plate support pins 35 pass. The inner retaining plates 20, 21 have notched grooves 30 engageable with the side edges 29 of the wiring boards 18, and are arranged so as to be engaged only in the direction of depth of the cavity grooves. Further, each plate 22 has holes 31 engageable with the tips of the control electrodes 13a formed at a predetermined pitch, so that the holes 31 can be engaged with the control electrodes 13a only in the direction of depth of the cavity grooves. The outermost electrode retaining plates 19, 23 are merely thickness adjusting iron plates. The adjusting plate 24 made of such an elastic material as MORUTO-PRENE are inserted between the plate 22 and the plate 23, so that the wiring board 18 and the control electrodes 13a, both supported between the respective plates 19 to 23 do not play within each of the cavity grooves 2, 3 by elasticity of the adjusting plate 24. A mold release agent is applied at least to the bottoms of the inner control electrode retaining plates 21, 22 and the cavity grooves 2, 3.

Further, a rigid plate 25 made of an iron plate is arranged on the bottom of each of the cavity grooves 2, 3. The plate 25 is disposed on the side surface of the electrode support block 33 along the recording electrodes and the control electrodes. The plate 25 has a hole 34 at a predetermined position, and a nut 26 is fitted into the hole 34. That is, the plate 25 and the nut 26 as assembled are placed within each of the cavity grooves 2, 3 in advance while combined, and are embedded in the electrode support block 33 as an insert part. Further, the plate 25 has a plurality of holes 38 for allowing the resin to enter at the time of insert molding. Each hole 38 is preferably a tapered hole or a stepped hole with the diameter thereof being increased toward the bottom. A cap nut in which portions other than the portion facing the bottom of each of the cavity grooves 2, 3 are closed is used as the nut 26. While the shape and structure of the nut 26 is not particularly limited, it is preferred that the shape of at least the outer circumferential surface of the portion enclosed by the resin 33' is noncircular in order to improve the adhesively retaining force. If the nut 26 is high enough to reach the wiring board 18, the wiring board 18 can be supported also by the nut 26. At the same time, the nut 26 is supported not only by the plate 25 but also by the wiring board 18 so as to have the head portion thereof biased.

Then, the wires 15 are arranged at a predetermined pitch while engaged with the wire retaining grooves 14 by winding or hooking the wires 15 on the pins $7_L$, $7_R$, $8_L$, $8_R$, $9_L$, $9_R$ on both left and right sides of each of the molds 1, 1 so as to traverse the cavity grooves 2, 3. How the wires 15 are hooked on the respective pins $7_L$, $7_R$, $8_L$, $8_R$, $9_L$, $9_R$ is not particularly limited. For example, a winding method such as a novel method may be adopted. Upon completion of arranging the last block of wires, M blocks of wires, each block consisting of N wires, are respectively fixed to portions close to the turn pins $9_L$, $9_R$ by a rapid cure adhesive lest each of the M bundles of wires should come apart. Then, the wire 15 paid off from the nozzle of the winding machine is cut.

Upon completion of arranging the M×N wires, the thus prepared mold 1 is set end-to-end with the paired mold 1. Then, both end faces of the pair of molds 1, 1 are closed, and a fixing plate (not shown) having a resin charging inlet for charging the insulating resin is attached. The molten insulating resin 33' is charged into the cavity grooves 2, 2, 3, 3 of the pair of opposed molds 1, 1 alternately to form the electrode support block 33, so that the respective wires 15 and control electrodes 13a, 13b are fixed therein. It goes without saying that the resin 33' must be charged lest the arrangement of the wires 15 that are wound in parallel with one another and the positional relationship between each plate 25 and the corresponding nut 26 should be disturbed.

Figure 11:
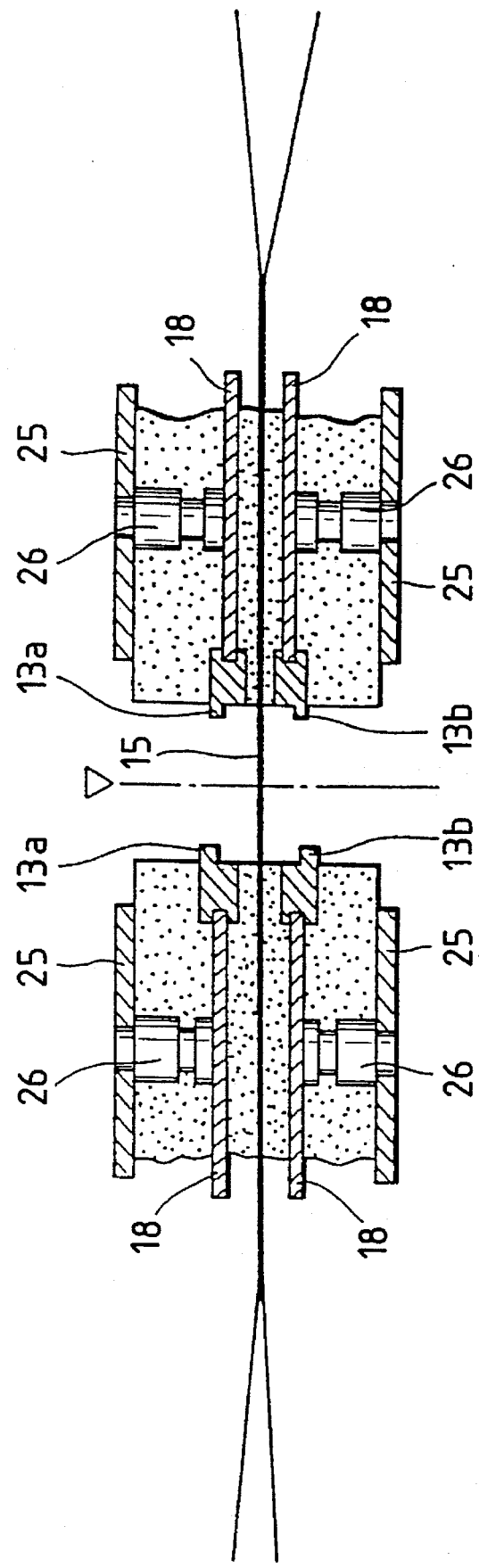
FIG. 11 is a sectional view showing a head element that has just been taken out of the mold.
Figure 12:
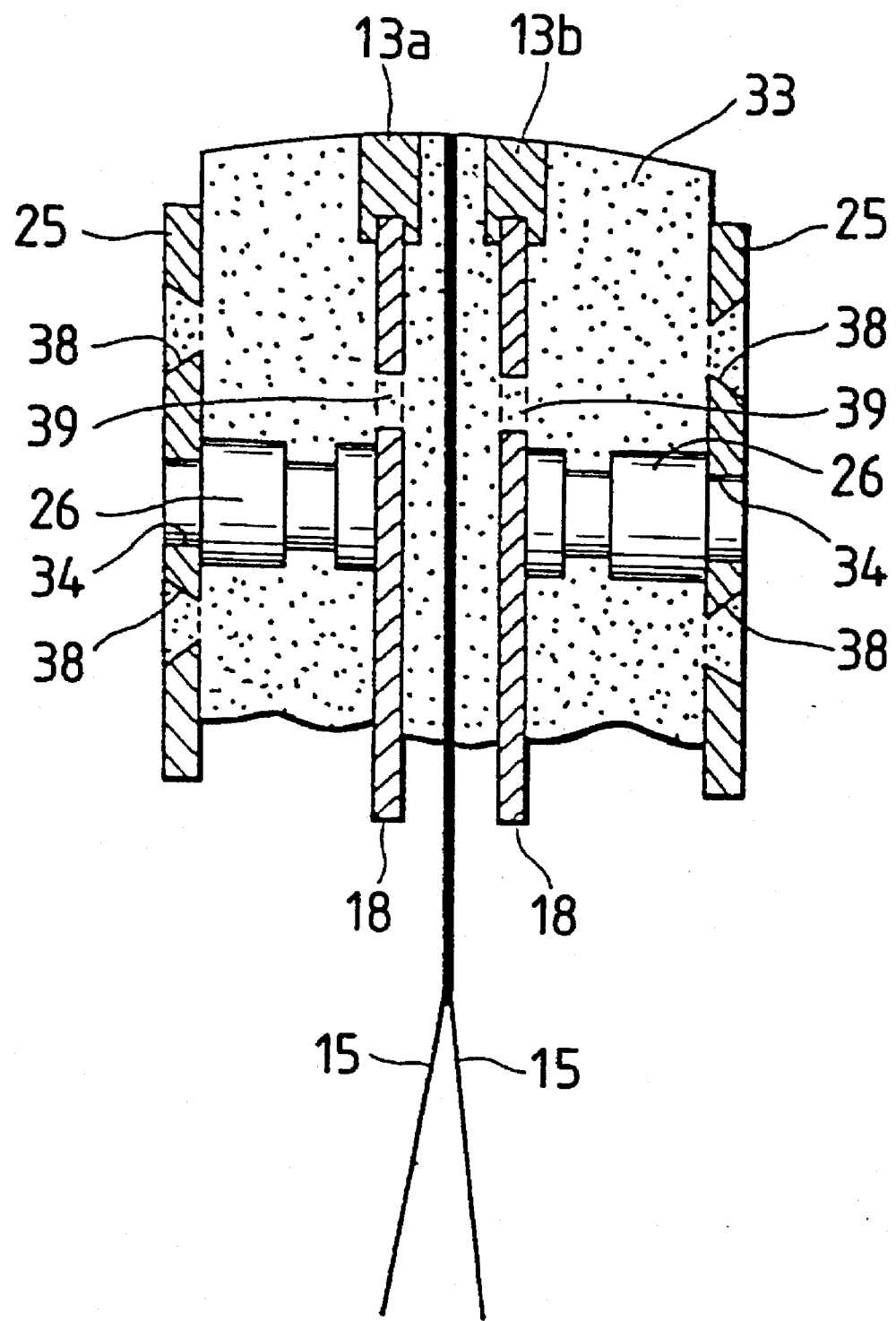
FIG. 12 is a longitudinal sectional view showing an exemplary multi-needle recording head.

After charging, the plates $12_L$, $12_R$ are taken out of the mold 1, and the bundles of wires 15, respectively wound onto the turn pins $9_L$, $9_R$ are also taken out. Then, as shown in FIG. 10, the plate support pins 35 of the mold 1 are pulled out to release the control electrode retaining plates 19, 20, 21, 22, 23, 24 of the cavity grooves 2, 3. The mold 1 is lowered thereafter to relatively take out the head element fixed by the electrode support block 33 together with the control electrode support plates 21, 22 and the like from the cavity grooves 2, 3. Then, the head element is taken out together with the control electrode support plates 21, 22 and the like from the paired mold 1. Since the control electrode support plates 21, 22 are arranged so as not to adhere to the head element by the mold release agent, the control electrode support plates 21, 22 can be separated from the head element with ease. The head element as just taken out is shown in FIG. 11. The head element is thereafter split into two head elements by cutting the wires 15 engaged with the wire retaining grooves 14 on the projection 4 in the middle. By grinding the head surfaces, multi-needle recording heads such as shown in FIG. 12 are obtained.

As shown in FIG. 7, the multi-needle recording head obtained in the above way is characterized as having the rigid plates 25, 25 formed integrally with the electrode support block 33 on both side surfaces of the electrode support block 33 along the staggered wires 15 forming the first array of M×N recording electrodes and the second array of M×N recording electrodes and along the control electrodes 13a, 13b arranged on both sides of these arrays at a distance.

The above embodiment is merely a preferred embodiment of the invention; the application of the invention is not limited thereto, but may be modified in various modes within the scope and spirit of the invention. For example, the shape of the mold 1 is not particularly limited to the rectangular one shown in FIGS. 7 to 10, but may be an octagonal one.

As is apparent from the foregoing, the multi-needle recording head of the invention is characterized as having the retaining member for retaining recording electrode wires within the electrode support block. Therefore, the stress produced by the hardening and contraction of the resin in the electrode support block can be lessened and, therefore, generation of defects such as cracks in the vicinity of the recording electrodes on the surface of the electrode support block, particularly on the surface of the head can be prevented.

Further, the method of manufacturing the multi-needle recording head of the invention is characterized as supporting the recording electrode wires by the retaining members, each having a pressure sensitive adhesive or an adhesive arranged at least on a surface thereof contacting the recording electrode wire, with the recording electrode wires wound around the winding jig before the recording electrode wires are cast into the electrode support block made of an electrically insulating resin. Therefore, the recording electrode wire supporting pitch becomes short, which in turn controls intimate contact between the recording electrode wires due to surface tension of the resin in the vicinity of the head surface or due to linear expansion caused by the heat of the resin to a small degree and, therefore, prevents slackening or displacement of the recording electrode wires. In addition, even if the recording electrode wires are about to be displaced or slackened by the charging of the resin, it is not likely that displacement or slackening will occur at least with the recording electrode wires exposed to the head surface. As a result, the recording electrodes that are linearly arranged at a predetermined pitch can be formed.

As is apparent from the foregoing, the apparatus for molding a multi-needle recording head of the invention is characterized as including: a mold not only having wire retaining grooves 14 formed on at least two parallelly extending projections, the wire retaining grooves serving to arrange wires forming the recording electrodes at a predetermined pitch by engaging the wires therewith, but also having a cavity groove formed between the projections, the cavity groove serving to receive the resin for solidifying the wires; at least two control electrode support plates for supporting a wiring board at both side edges of the wiring board, one side edge of the wiring board being a terminal section having the control electrodes electrically connected thereto in advance; and an adjusting plate made of an elastic member and interposed between the control electrode support plate and the projection. Such apparatus allows the adjusting plate and the control electrode support plates to be disposed on the inner sides of the projections. Therefore, even if under cut portions are produced when an extruded aluminum member is used as the mold, a play provided by the adjusting plate being taken out facilitates the multi-needle recording heads to be taken out. In addition, since the adjusting plate fills the gap between the control electrode support plate and the projection of the mold, playing of the control electrode support plate can be prevented. That is, the presence of the elastic adjusting plate prevents variations in the thickness of the control electrode support plates as well as variations in the positioning of the control electrodes by the control electrode support plates even if the projections are slightly inclined inward.

Further, if the control electrode support plates and the adjusting plate are attached to the plate engaging grooves arranged in the cavity groove of the mold and are releasably fixed to the mold with a pin passing through these plate engaging grooves, the control electrode support plates can be positioned correctly with ease and hence the positional accuracy of the control electrodes can be obtained with ease.

What is claimed is:

1. A multi-needle recording head comprising:

an electrode member including a pair of injected resin support blocks and retaining members for retaining recording electrode wires, said retaining members being sandwiched between said support blocks, wherein the recording electrodes are retained by said retaining members to allow for subsequent molding of the electrode wires by injection of resin forming said resin support blocks, wherein each of said retaining members has one of a pressure sensitive adhesive and an adhesive arranged at least on a surface thereof contacting an associated one of said recording electrode wires and wherein each of said retaining members is elastic.

2. A method of manufacturing a multi-needle recording head using a winding jig having wire retaining grooves arranged at a predetermined pitch comprising the steps of:

providing wire retaining members proximate each of the wire retaining grooves;

winding recording electrode wires on the wire retaining grooves such that the wires are retained by said wire retaining members; and injecting resin into said jig so as to form electrically insulating electrode support blocks for permanently holding the wires, wherein each of said retaining members has a pressure sensitive adhesive or an adhesive arranged at least on a surface thereof contacting a recording electrode wire.

3. A method of manufacturing a multi-needle recording head according to claim 2, wherein the retaining members are disposed in the vicinity of a head surface.

4. A multi-needle recording head comprising:

a plurality of recording electrodes;

a plurality of control electrodes interposing the recording electrodes therebetween;

a pair of wiring boards mounted in a vicinity of the control electrodes;

an electrode support block made of insulating resin, the electrodes support block surrounding the recording electrodes and the control electrodes;

a pair of mounting plates mounted on both sides of the electrode support block; and a retaining member embedded between the wiring boards to retain the recording wires.

5. A multi-needle recording head as claimed in claim 4, wherein the retaining member is made of one of elastic member and nonelastic member.

6. A multi-needle recording head as claimed in claim 4, wherein the retaining member formed by interposing an elastic member between pressure sensitive adhesive double coated tapes.

* * * * *